United States Patent
Oliver et al.

(10) Patent No.: US 11,585,636 B2
(45) Date of Patent: Feb. 21, 2023

(54) BORE SIGHT WITH ARBOR SYSTEM

(71) Applicant: Osprey Global, LLC, Cartersville, GA (US)

(72) Inventors: Keith Oliver, Cartersville, GA (US); Yang Shengbao, Zhongshan (CN)

( * ) Notice: Subject to any disclaimer, the term of this patent is extended or adjusted under 35 U.S.C. 154(b) by 0 days.

(21) Appl. No.: 16/802,800

(22) Filed: Feb. 27, 2020

(65) Prior Publication Data

US 2021/0270571 A1 Sep. 2, 2021

(51) Int. Cl.
| | | |
|---|---|---|
| F41G 3/26 | (2006.01) |
| F41G 1/35 | (2006.01) |
| F41G 11/00 | (2006.01) |
| G09B 9/00 | (2006.01) |
| F41G 1/54 | (2006.01) |

(52) U.S. Cl.
CPC .............. *F41G 1/35* (2013.01); *F41G 11/001* (2013.01); *G09B 9/003* (2013.01); *F41G 1/545* (2013.01)

(58) Field of Classification Search
CPC ..... F41G 1/32; F41G 1/34; F41G 1/35; F41G 1/54; F41G 1/545; F41G 3/145; F41G 3/3616; F41G 3/2622; F41G 3/2655; F41G 3/32; F41G 3/323; F42B 8/00; F42B 8/02; F42B 8/08; F42B 8/10
See application file for complete search history.

(56) References Cited

U.S. PATENT DOCUMENTS

| | | | | |
|---|---|---|---|---|
| 1,179,021 A | * | 4/1916 | Mayer | F42B 8/10 |
| | | | | 102/446 |
| 1,191,618 A | * | 7/1916 | Saffold | F41A 21/10 |
| | | | | 42/77 |
| 1,517,702 A | * | 12/1924 | Brubaker | F42B 8/10 |
| | | | | 102/446 |
| 3,938,262 A | * | 2/1976 | Dye | F41A 33/02 |
| | | | | 434/21 |
| 4,126,954 A | * | 11/1978 | Plummer | F41A 21/12 |
| | | | | 102/444 |
| 4,430,940 A | * | 2/1984 | Jermunson | F42B 8/10 |
| | | | | 102/446 |
| 4,481,561 A | * | 11/1984 | Lanning | F41A 33/02 |
| | | | | 362/111 |
| 4,678,437 A | * | 7/1987 | Scott | F41A 33/02 |
| | | | | 434/21 |
| 4,983,123 A | * | 1/1991 | Scott | F41A 33/02 |
| | | | | 362/111 |
| 5,365,669 A | * | 11/1994 | Rustick | F41A 33/02 |
| | | | | 33/DIG. 21 |
| 5,488,795 A | * | 2/1996 | Sweat | F41A 33/02 |
| | | | | 362/112 |
| 5,685,106 A | * | 11/1997 | Shoham | F41A 33/02 |
| | | | | 42/116 |

(Continued)

*Primary Examiner* — Derrick R Morgan
(74) *Attorney, Agent, or Firm* — Baker Donelson Bearman Caldwell & Berkowitz PC

(57) ABSTRACT

A laser bore sight with arbor system is disclosed which includes a bore sight with a housing, a laser and an activation switch. The system also includes a plurality of arbors, each arbor having a sleeve with an interior channel configured to be received the bore sight. Each arbor is configured to fit within the bore and/or breach of a firearm. The exterior configuration of each arbor is different and specifically configured to fit a specific caliber of firearm. The sleeve has a rear end to which is coupled an end cap having and opening through which the bore sight activation switch extends.

13 Claims, 2 Drawing Sheets

(56) References Cited

U.S. PATENT DOCUMENTS

| | | | |
|---|---|---|---|
| 5,716,216 A * | 2/1998 | O'Loughlin | F41A 33/02 273/365 |
| 5,787,631 A * | 8/1998 | Kendall | F41A 33/02 42/116 |
| 5,909,951 A * | 6/1999 | Johnsen | F41A 33/02 362/111 |
| 6,151,788 A * | 11/2000 | Cox | G01B 11/27 33/286 |
| 6,216,381 B1 * | 4/2001 | Strand | F41A 33/02 42/113 |
| 6,295,753 B1 | 10/2001 | Thummel | |
| 6,389,730 B1 * | 5/2002 | Millard | F41A 33/02 42/116 |
| 6,499,247 B1 | 12/2002 | Peterson | |
| 6,606,797 B1 * | 8/2003 | Gandy | F41A 33/02 33/227 |
| 6,622,414 B1 * | 9/2003 | Oliver | F41A 33/02 42/116 |
| 6,631,580 B2 * | 10/2003 | Iafrate | F41A 33/02 42/134 |
| 6,742,299 B2 * | 6/2004 | Strand | F41A 33/02 42/116 |
| 6,869,285 B1 * | 3/2005 | Jones, II | G09B 19/00 42/10 |
| 7,260,911 B2 | 8/2007 | Davis | |
| 7,647,720 B1 | 1/2010 | Vendetti | |
| 7,900,391 B1 * | 3/2011 | Mihelish | F41A 31/02 42/116 |
| 8,074,555 B1 | 12/2011 | Sullivan et al. | |
| 8,132,354 B1 | 3/2012 | Sellers et al. | |
| 8,186,094 B2 * | 5/2012 | AlKandari | F41G 1/54 42/116 |
| 8,584,587 B2 * | 11/2013 | Uhr | F42B 8/10 102/446 |
| 8,734,156 B2 * | 5/2014 | Uhr | F41A 35/00 434/19 |
| 8,938,904 B1 | 1/2015 | Sellers et al. | |
| 9,074,832 B1 * | 7/2015 | Collins | F41A 15/06 |
| 9,170,079 B2 * | 10/2015 | Moore | F42B 12/42 |
| 10,132,595 B2 * | 11/2018 | Moore | F41G 1/467 |
| 10,578,382 B1 * | 3/2020 | Melnikov | F41A 21/06 |
| 10,739,109 B1 * | 8/2020 | Tello | F41G 3/323 |
| 2002/0057719 A1 * | 5/2002 | Shechter | F41A 33/02 372/16 |
| 2002/0129536 A1 * | 9/2002 | Iafrate | F41A 33/02 42/134 |
| 2003/0003424 A1 * | 1/2003 | Shechter | F41A 33/02 434/21 |
| 2005/0115139 A1 * | 6/2005 | Thiakos | F41A 31/02 42/116 |
| 2007/0169392 A1 * | 7/2007 | Davis | F41G 3/323 42/116 |
| 2011/0207088 A1 * | 8/2011 | Uhr | G09B 5/00 434/21 |
| 2011/0219658 A1 * | 9/2011 | AlKandari | F41G 1/54 42/116 |
| 2011/0287389 A1 * | 11/2011 | Uhr | F42B 8/08 434/21 |
| 2011/0297742 A1 | 12/2011 | Sullivan et al. | |
| 2012/0167440 A1 | 7/2012 | StPhillips et al. | |
| 2012/0224387 A1 * | 9/2012 | Moore | F42B 8/00 362/553 |
| 2013/0309633 A1 * | 11/2013 | Carriere | F41G 3/2616 434/21 |
| 2019/0101349 A1 * | 4/2019 | Stetler | F41A 33/00 |

* cited by examiner

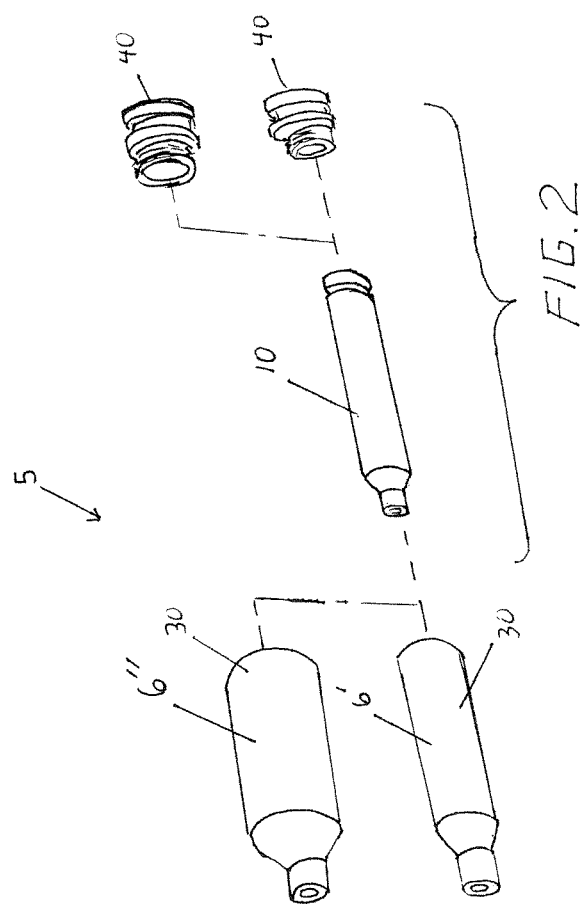

BORE SIGHT WITH ARBOR SYSTEM

TECHNICAL FIELD

This invention relates to bore sights, as specifically to laser bore sights which are capable of being utilized in different firearms.

BACKGROUND OF THE INVENTION

It has been well known to provide rifles or pistols with sights to guide the operator in aiming the firearms. High power scopes are often utilized to provide an accurate sight at most ranges. The scope is mounted on the top of the firearm to provide a magnified view of the potential target when sighted. Cross hairs within the scope are used to sight the target, with the intersection of the cross hairs being placed exactly on the intended target. Limitations of the high powered scope include the problem that the scope must be "calibrated" to assure accuracy. Typically, adjusting screws are provided which can be used to adjust the scope so that the cross hairs are accurately marking the target. If a rifle, for example, was mounted on a stand and the target sighted in the cross hairs of the scope, minor adjustments of the scope may be necessary to assure accuracy. Adjustments are made by firing a round of ammunition and noting where the round strikes with respect to the target. Mechanical adjustment of the scope can then be made to align the cross hairs of the scope with the actual point at which the round of ammunition struck the target. It may take several attempts of this trial and error firing of the rifle and adjusting the scope to bring the cross hairs in line with the actual striking point of the ammunition round. As can be expected, this procedure, even when performed by a skilled marksman, is time consuming and inherently imprecise.

Designers have adapted lasers to aid in the sighting process of a firearm. Some lasers have been designed to be mounted to the top of the barrel. However, the path of the ammunition round does not follow the exact path of the laser's light. As such, even when one finally aligns the scope with the laser beam the scope is still misaligned with the round's path. To alleviate this problem, lasers have been designed to be mounted within the barrel of a rifle to more accurately depict the path of the round. Some of these lasers have been positioned within the end of the barrel. These lasers however do not always align with the ammunition's path of travel. To provide more accuracy, bore sight lasers have been designed to include a housing configured to be mounted within the breech or chamber of the barrel. With the laser positioned within this area the light from the laser generally follows the bore of the barrel and thus the initial path of the ammunition. Of course, the laser diode within the housing may have to be adjusted so that the light does indeed travel along the bore of the barrel.

A problem with bore sights is that the outer housing is configured to fit a specific rifle bore and breach relating to the caliber. As such, the bore sight configured to fit one specific caliber of firearm does not properly fit within the bore or breach of a different caliber of firearm. Therefore, for a gun owner having more than one firearm, the gun owner must purchase several bore sights, one for each caliber of gun the owner wishes to sight with a bore sight.

Some bore sight manufacturers have made arbors or sleeves which fit about a bore sight. The arbors provide an outer shape or configuration which can be varied between arbors to provide its use with different calibers of firearms. The problem with these arbors is that the bore sight is typically slid into the rear opening of arbor. This type of arbor has proven to cause difficulties between the bore sight may move slightly within the arbor, wherein even slight movements may cause inaccuracies in sighting a firearm. Additionally, the bore sight may slide out of the arbor, causing damage to the bore sight and an inconvenience to the user.

Accordingly, it is seen that a need remains for a laser bore sight which may be used in different calibers of firearms, but maintains security and accuracy. It is to the provision of such therefore that the present invention is primarily directed.

SUMMARY OF THE INVENTION

In a preferred form of the invention a bore sight with arbor system comprises a bore sight having an exterior housing with a select exterior surface configuration, and a laser mounted within the exterior housing. The laser has an activation switch. The system also includes a plurality of arbors, wherein each arbor has a tubular housing having an internal channel with a front opening and a rear opening. The internal channel is configured to conform with the select exterior surface configuration of the bore sight exterior housing. The arbors also have an end cap releaseably coupled to the tubular housing. The end caps have an end cap channel therethrough configured to allow actuation of the laser activation switch through the end cap channel but prevents the passage of the bore sight through the end cap channel.

BRIEF DESCRIPTION OF THE DRAWING

FIG. 2 is a cross-sectional view of the bore sight with arbor system of FIG. 1.

DETAILED DESCRIPTION

Figure 1:
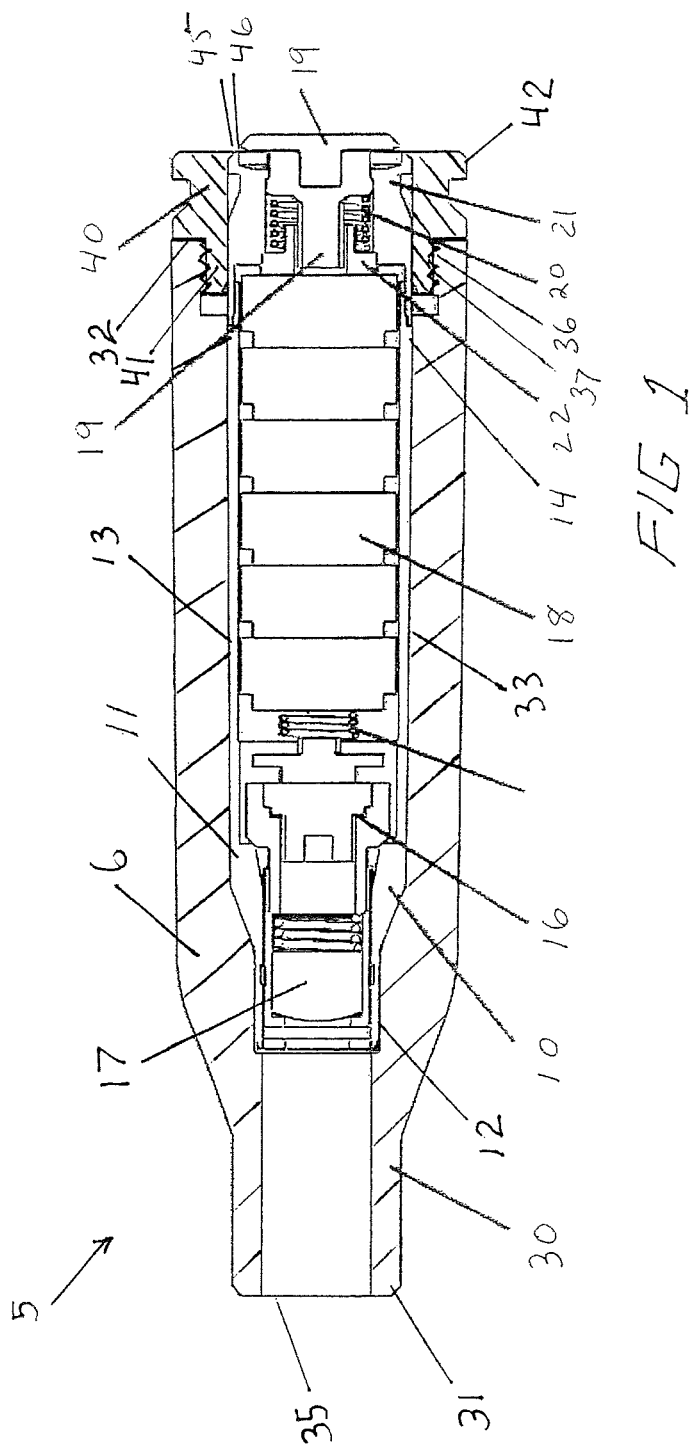
FIG. 1 is a perspective view of a bore sight with arbor system embodying principles of the invention in a preferred form.

With reference next to the drawings, there is shown a laser bore sight with arbor system 5 in a preferred form of the invention. The laser bore sight arbor system 5 includes a plurality of arbors 6 and a bore sight 10 configured to be mounted within each of the arbors 6.

The bore sight 10 is designed to be utilized within a gun, rifle, or other firearm, referenced collectively herein as firearm. The bore sight 10 has a tubular, outer housing 11 has an outer or exterior surface which may be configured to be received in the bore, breach, chamber or combination thereof of a firearm, referenced hereinafter as bore. It should be noted that the configuration of the housing 11 may or may not be configured for a specific caliber of the firearm.

The outer housing 11 has a front portion 12, a middle portion 13 and a rear portion 14. The laser or internal components of the bore sight are as described in U.S. Pat. No. 6,622,414, which is specifically incorporated herein. The laser includes a laser diode 16, lens 17, a series of batteries 18 electrically coupled to the diode, and a push button activation or on/off switch 19 electrically coupled to the batteries 18. The laser diode 16 and lens 17 are mounted within the front portion 12 so as to generate and direct a visible light beam of collimated light through a front opening in the front portion 12 and lens 17. The batteries 18 are mounted in series within the middle portion 13 of the housing. The on/off switch 19 includes a spring 20, and end cap 21, and a stop 22. The term laser, as used herein, is intended to represent the combination of the internal components which together produce the laser light.

Each arbor 6 has a tubular housing or sleeve 30 configured to be received in the bore of a firearm. The exterior or exterior surface configuration of each arbor 6 is different and specifically configured to fit a specific or select caliber of firearm. For example, arbor 6' may have an exterior configuration of a .223 caliber ammunition while arbor 6" may have an exterior configuration of a 30-06 caliber ammunition. Thus, the exterior configuration of each arbor includes a different select ammunition shape, i.e., ammunition shape being the exterior shape of a specific caliber of ammunition.

The sleeve 30 has a front end 31 and a rear end 32. A bore sight channel 33 extends longitudinally between the front end 31 and rear end 32. The channel 33 is configured to generally conform with the exterior shape of the bore sight 10. The channel 33 has a front opening 35 at the sleeve front end 31 and a rear opening 36 at the sleeve rear end 32. The channel and front end 31 are aligned with the bore sight 10 so that the light generated by the bore sight 10 passes through the channel 33 and exits through the front opening 35. The rear opening and adjoining channel 33 has internal threads or a threaded portion 37.

Each arbor 6 also has a tubular end, end ring, or end cap 40 having an externally threaded portion, end or stem 41 and an annular flange 42 extending from the threaded stem 41. The cap 40 has a longitudinally extending channel or opening 43. The channel 42 has a main portion 44 of a select diameter and an inwardly extending lip, ledge, or rim 45 of a select diameter less than the diameter of the main portion 44. The inwardly extending rim 45 defines a rear opening 46. The select diameter of the main portion 44 fits or conforms to the diameter of the rear portion 14 of the bore sight 10, while the select diameter of the rim 45 is smaller that the diameter of the rear portion 14 of the bore sight 10. However, the rear opening 46 is larger than the size or diameter of the push button switch 19 so that the push button switch 19 may extend through the rear opening 46 and be actuated manually by an operator or mechanically through the closing of the firearm bolt or breach.

In use, a person mounts the bore sight 10 within the proper caliber arbor 6 by sliding the bore sight 10 into the rear opening 36 of the sleeve 30 and into the sleeve channel 33, as shown in FIG. 2. The end cap 40 is then coupled to the sleeve 30 by threading the external threads of the cap stem 41 into the internal threaded portion 37 of the sleeve. With the end cap 40 threaded into the sleeve 30, the bore sight 10 fits snugly within the sleeve channel 33 with the rear portion 14 of the bore sight 10 also fitting within the channel 43 of the end cap 40. The end cap rim 45 abuts the rear portion 14 of the bore sight to maintain a proper position within the arbor 6. The on/off switch 19 extends outwardly from the channel 43 of the end cap 40, so that it may be actuated to turn the bore sight on or off, either manually or mechanically.

With the bore sight 10 activated through the on/off switch 19, the laser bore sight arbor system 5 is then slid into the breach and/or bore of a firearm. Alternatively, the bore sight 10 may be activated through the closing of the breach or bolt of the firearm. The light produced from the laser diode 16 extends through the sleeve channel 33 and exits the sleeve 30 through front opening 35.

The bore sight with arbor system 5 is designed to allow the plurality of arbors 6 to be utilized and switched between different arbors 6 so that the same bore sight 10 may be used with firearms of different calibers. The bore sight with arbor system 5 allows the first arbor 6' to be switched with a second arbor 6" by simply unscrewing or unthreading the end cap 40 from the rear opening 36 of the first arbor's sleeve 30 and extracting the bore sight 10 from the channel 43. The bore sight 10 is then slid into the channel 43 of the second arbor 6" and the end cap 40 is threaded into the second arbor's rear opening 36. Thus, multiple arbors for multiple calibers may be used with the same bore sight 10.

It should be understood that the arbors 6 may be configured to have the rear end with a channel 43 therethrough and a removable front end to enable the bore sight 10 to be inserted into the sleeve 30 through the front end. With this configuration the removable front end would be considered a removable end cap.

It thus is seen that a laser bore sight is now provided which overcomes problems with those of the prior art. While this invention has been described in detail with particular references to the preferred embodiments thereof, it should be understood that many modifications, additions and deletions, in addition to those expressly recited, may be made thereto without departure from the spirit and scope of the invention as set forth in the following claims.

The invention claimed is:

1. A bore sight with arbor system comprising:
   a bore sight having an exterior housing with a select exterior surface configuration having varying diameters, and a laser mounted within said exterior housing, said laser having an activation switch, said activation switch extending beyond the exterior housing, and
   a first arbor having a first tubular housing having a first internal channel with a first front opening and a first rear opening, said first internal channel having varying diameters and is configured to conform with said select exterior surface configuration with varying diameters of said bore sight exterior housing, said first arbor also having a first end cap releaseably coupled to said first tubular housing, said first end cap having a first end cap channel therethrough configured to allow actuation of said laser activation switch through said first end cap channel, but prevent the passage of said bore sight through said first end cap channel.

2. The bore sight with arbor system of claim 1 wherein said first end cap channel has an inwardly extending first rim configured to abut said bore sight to prevent said bore sight from passing through said first end cap channel.

3. The bore sight with arbor system of claim 1 wherein said first tubular housing first rear opening includes first internal threads, and wherein said first end cap includes a first stem portion having first external threads configured to be mesh with said first internal threads.

4. The bore sight with arbor system of claim 1 wherein said activation switch extends through said first end cap channel.

5. A bore sight with arbor system comprising:
   a bore sight having an exterior housing, a laser mounted within said exterior housing, and a laser activation switch having an activation button, said activation button extending beyond said exterior housing, and
   a first arbor having a first sleeve with a first internal channel configured to conform with said bore sight, said first internal channel having a first front opening and a first rear opening, said first arbor also having a first end cap releaseably coupled to said first sleeve to confine said bore sight within said first internal channel, said first end cap having a first end cap channel therethrough configured to allow extension of said bore sight therein and to allow actuation of said laser activation switch through said first end cap channel.

6. The bore sight with arbor system of claim 5 wherein said first end cap channel has an inwardly extending first rim configured to abut said bore sight to prevent said bore sight from passing through said first end cap channel.

7. The bore sight with arbor system of claim 5 wherein said first sleeve first rear opening includes first internal threads, and wherein said first end cap includes a first stem portion having first external threads configured to be mesh with said first internal threads.

8. The bore sight with arbor system of claim 5 wherein said activation switch extends through said first end cap channel.

9. A bore sight with arbor system comprising:
a bore sight having an exterior housing, a laser mounted within said exterior housing, and a laser activation switch having an activation button, said activation button extending beyond the exterior housing, and
a first arbor having a first tubular housing having a first internal channel with a first front opening and a first rear opening, said first internal channel being configured to conform with said select exterior surface configuration of said bore sight exterior housing, said first arbor also having a first end cap releaseably coupled to said first tubular housing, said first end cap having a first end cap channel therethrough configured to allow actuation of said laser activation switch through said first end cap channel, said first end cap channel including an inwardly extending first rim at a rearmost position from an internal surface of said rear opening, said inwardly extending first rim configured to prevent the passage of said bore sight through said first end cap channel.

10. The bore sight with arbor system of claim 9 wherein said end cap is coupled to a rear end of said sleeve, and wherein said end cap has an end cap channel therethrough configured to allow actuation of said laser activation switch through said end cap channel.

11. The bore sight with arbor system of claim 10 wherein said inwardly extending rim is configured to abut said bore sight to prevent said bore sight from passing through said end cap channel.

12. The bore sight with arbor system of claim 10 wherein said arbor sleeve rear end includes internal threads, and wherein said arbor end cap includes a stem portion having external threads configured to mesh with said internal threads.

13. The bore sight with arbor system of claim 10 wherein said activation switch extends through said end cap channel.

\* \* \* \* \*